(12) United States Patent
Zohar et al.

(10) Patent No.: US 7,904,747 B2
(45) Date of Patent: Mar. 8, 2011

(54) RESTORING DATA TO A DISTRIBUTED STORAGE NODE

(75) Inventors: Ofir Zohar, Alfe Menashe (IL); Haim Helman, Ramat-Gan (IL); Shemer Schwartz, Herzelia (IL); Efri Zeidner, Kiryat Mozkin (IL); Kariel Sendler, Bat Hefer (IL); Shai Gross, Hadera (IL)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/333,393

(22) Filed: Jan. 17, 2006

(65) Prior Publication Data

US 2007/0174671 A1    Jul. 26, 2007

(51) Int. Cl.
     *G06F 11/00*          (2006.01)
(52) U.S. Cl. ............................................................ 714/6
(58) Field of Classification Search .................... 714/6
See application file for complete search history.

(56) References Cited

U.S. PATENT DOCUMENTS

| | | | |
|---|---|---|---|
| 5,345,590 A * | 9/1994 | Ault et al. .......................... 718/1 |
| 5,644,696 A * | 7/1997 | Pearson et al. ..................... 714/6 |
| 5,720,029 A * | 2/1998 | Kern et al. ....................... 714/20 |
| 5,889,935 A * | 3/1999 | Ofek et al. ......................... 714/6 |
| 5,897,661 A * | 4/1999 | Baranovsky et al. .......... 711/170 |
| 5,931,955 A * | 8/1999 | Kung ............................... 714/15 |
| 6,104,392 A * | 8/2000 | Shaw et al. .................... 715/749 |
| 6,173,413 B1 * | 1/2001 | Slaughter et al. .................. 714/6 |
| 6,205,449 B1 * | 3/2001 | Rastogi et al. ................ 707/202 |
| 6,397,308 B1 * | 5/2002 | Ofek et al. ..................... 711/162 |
| 6,401,215 B1 * | 6/2002 | Maddalozzo et al. ............. 714/6 |
| 6,578,120 B1 * | 6/2003 | Crockett et al. ............... 711/162 |
| 6,654,954 B1 * | 11/2003 | Hicks ............................. 717/162 |
| 6,721,901 B1 * | 4/2004 | McBrearty et al. ................ 714/6 |
| 7,340,640 B1 * | 3/2008 | Karr et al. .......................... 714/6 |
| 7,447,843 B2 * | 11/2008 | Ishikawa et al. .............. 711/129 |
| 7,487,385 B2 * | 2/2009 | Rodrigues et al. ................ 714/6 |
| 2005/0278703 A1 * | 12/2005 | Lo et al. ......................... 717/126 |
| 2006/0020923 A1 * | 1/2006 | Lo et al. ......................... 717/127 |

\* cited by examiner

*Primary Examiner* — Robert Beausoliel
*Assistant Examiner* — Elmira Mehrmanesh
(74) *Attorney, Agent, or Firm* — Griffiths & Seaton PLLC

(57) ABSTRACT

A method is disclosed for operating a data storage system having one or more network interfaces and a plurality of data storage nodes configured to provide redundant storage locations. The method includes storing a set of node partitions on a given storage node of the plurality of data storage nodes. The method also includes, following a recovery by the given storage node from a malfunction, making a determination for a node partition in the set whether the node partition is current or noncurrent, and processing the node partition according to the determination.

36 Claims, 5 Drawing Sheets

RESTORING DATA TO A DISTRIBUTED STORAGE NODE

FIELD OF THE INVENTION

The present invention relates generally to data storage systems, and specifically to methods for managing storage systems providing data redundancy.

BACKGROUND OF THE INVENTION

Data storage systems generally store data on physical media, such as direct access hard disks, in a manner that is transparent to host computers. From the perspective of a host computer, data items are stored at logical addresses located on file systems or logical volumes. Data storage systems map the logical addresses to physical locations on the physical media.

A data storage system may implement mechanisms of data redundancy that permit operation to continue if a unit of the physical media fails. Redundancy is achieved by mapping data to physical locations in such a manner that data lost when a unit fails may be retrieved or reconstructed from redundant locations on alternate units. The mapping may be based on methods such as mirroring or a Redundant Array of Inexpensive Disks (RAIDs).

When a unit of storage within a redundant data storage system fails, operation may continue because data stored on the failed unit is accessible elsewhere in the system. If the failed unit is returned to operation, through repair or replacement, the storage system may reconstruct the redundancy of the system by transferring to the returned unit the data stored at the redundant locations. The time delay caused by reconstructing the redundancy is a significant disadvantage of many systems providing redundancy.

A more efficient means of restoring redundant storage units is therefore needed.

Methods are known in the art that predict, or attempt to predict, occurrence of failure or incorrect operation in an element of a storage system. One such method, known as Self-Monitoring Analysis and Reporting Technology (SMART) incorporates logic and/or sensors into a hard disk drive to monitor characteristics of the drive. A more general protocol for monitoring network-connected devices, such as servers and storage systems is Intelligent Platform Management Interface (IPMI). The IPMI specification, developed by Dell, HP, Intel and NEC, defines interfaces for use in monitoring status features such as temperature, voltage, fans, power supplies and chassis. Values of the monitored characteristics are used to predict a possible pending problem, and/or provide an alert for such a problem. A description of IPMI is to be found at www.intel.com/design/servers/ipmi, incorporated herein by reference.

SUMMARY OF THE INVENTION

In embodiments of the present invention, a data storage system comprises a distributed group of data storage nodes which store data therein, the data being accessed by one or more hosts transmitting input/output (I/O) requests to the storage system. Each data storage node comprises non-volatile physical storage media, such as magnetic disks, as well as a communications controller, which performs the task of communicating with other elements of the data storage system. A data storage node may also comprise a cache that provides a faster source of recently accessed data.

I/O requests identify the data according to logical addresses. The storage system stores the data as logical partitions, which are mapped to the logical addresses. Each logical partition is stored redundantly, so that at least two nodes each have a copy of each logical partition. A distribution mapping, comprising distribution records, indicates the set of nodes at which copies of a logical partition are stored. The distribution records may also comprise a timestamp field that provides an indication of the time that the logical partition was most recently modified. Copies of logical partitions on a node are referred to hereinbelow as node partitions.

Each node maintains a partition descriptor record (PDR) for each node partition. The PDR provides a correspondence between a logical partition ID and the physical address at which the node partition is stored. The PDR may also comprise a timestamp field that provides an indication of the time that the node partition was most recently modified.

During operation of the system, a control unit of the data storage system, referred to hereinbelow as a system manager, may receive an indication of a malfunction of one of the nodes. Indications may include: lack of response by the node, an atypically slow response, an incorrect response, or a message such as a IPMI message indicating that the node is experiencing a malfunction or an impending malfunction. Upon receiving the indication, the system manager may notify other components of the system, such as network interfaces that the malfunctioning node is unavailable. I/O commands to access node partitions on the malfunctioning node are redirected to alternate nodes wherein the redundant partition copies are stored. System operation thus continues without the malfunctioning node. The system manager also records the time of malfunction.

After taking the aforementioned actions, the storage system may try to restore the malfunctioning node automatically. For example, the system manager may issue a control sequence that causes the malfunctioning node to reboot or to reset itself. Resetting may include powering down and then powering up the node. Alternatively or additionally, a message may be sent to a human operator, who may perform manual steps to restore the node to a functional state.

Once the node has recovered to a functional state, a flag is set for each node partition indicating that the node partition has not been validated. Validation is then performed for each node partition. Validation comprises determining whether the node partition is identical to the current state of the corresponding logical partition, and, if not, updating the node partition. In a disclosed embodiment, the node partition is determined to be identical if the timestamp of the partition indicates a time prior to the time of the malfunction. If the partition was changed subsequent to the time of the malfunction, the node partition is rebuilt by writing to the node a copy of the corresponding logical partition from a redundant location. Otherwise, if the partition has not been changed, then the node partition is left intact. After these validation steps are performed, the validation flag is set and the node partition becomes accessible to subsequent I/O commands.

By updating only those partitions that were modified after the malfunction, rather than rebuilding all data on the node, significantly less time is required to bring the node to a full operational mode in which all node partitions are accessible.

There is therefore provided, in accordance with an embodiment of the present invention, a method for operating a data storage system having one or more network interfaces and a plurality of data storage nodes configured to provide redundant storage locations, the method including:

storing a set of node partitions on a given storage node of the plurality of data storage nodes;

following a recovery by the given storage node from a malfunction, making a determination for a node partition in the set whether the node partition is current or noncurrent; and processing the node partition according to the determination.

Typically, processing the node partition according to the determination that the node partition is current includes making the node partition accessible to the one or more network interfaces without updating the node partition. In an embodiment, processing the node partition according to the determination that the node partition is current further includes setting a validation flag of the node partition to be valid.

Typically, processing the node partition according to the determination that the node partition is noncurrent includes updating the node partition and subsequently making the node partition accessible to the one or more network interfaces. In some embodiments, processing the node partition according to the determination that the node partition is noncurrent further includes setting a validation flag of the node partition to be valid after updating the node partition. In a further embodiment, the given storage node is a first storage node and updating the node partition includes reading a copy of a corresponding logical partition from a second storage node.

Typically, making the determination that the node partition is noncurrent includes determining that a corresponding logical partition was modified during a nonfunctional period of the given storage node prior to the recovery. In an embodiment, determining that the corresponding logical partition was modified includes determining that a timestamp of the corresponding logical partition is more recent than a time of the malfunction. In a further embodiment, determining that the timestamp of the corresponding logical partition is more recent includes testing a timestamp field at the one or more network interfaces. Alternatively or additionally, the given storage node is a first storage node and determining that the timestamp of the corresponding logical partition is more recent includes testing a timestamp field at a second storage node.

Typically, following the recovery from the malfunction, a validation flag of each node partition in the set is set to be invalid.

Typically, making the determination for the node partition includes making the determination for each node partition in the set.

In some embodiments, making the determination for the node partition and processing the node partition include making the determination for, and processing, each of the node partitions in the set.

Typically, the method further includes performing a check that the malfunction has been alleviated. In an embodiment, performing the check includes determining that non-volatile memory on the given storage node remains intact.

Typically, the method further includes issuing an indication of the malfunction after determining that there is an impending malfunction.

Typically, the method further includes making the given storage node functional following the malfunction. In some embodiments, making the given storage node functional includes automatically resetting the given storage node. Alternatively or additionally, making the given storage node functional includes manually repairing the given storage node.

In some embodiments, the method further includes receiving a malfunction indication and, responsively to receiving the malfunction indication, diverting an input/output command addressing any of the node partitions in the set.

There is further provided apparatus for operating a data storage system including:

one or more network interfaces; and a storage node, configured to provide redundant storage locations and including a set of node partitions, and which is operative following a recovery from a malfunction to make a determination for a node partition in the set whether the node partition is current or noncurrent, and which is adapted to process the node partition according to the determination.

Typically, the storage node is further adapted to process the node partition according to the determination that the node partition is current by making the node partition accessible to the one or more network interfaces without updating the node partition.

Typically, the storage node is further adapted to process the node partition according to the determination that the node partition is current by setting a validation flag of the node partition to be valid. In some embodiments, the storage node is further adapted to process the node partition according to the determination that the node partition is noncurrent by making the node partition accessible to the one or more network interfaces after updating the node partition. In further embodiments, the storage node is adapted to process the node partition according to the determination that the node partition is noncurrent by setting a validation flag of the node partition to be valid after updating the node partition. Also in further embodiments, the given storage node is a first storage node and the storage node is adapted to update the node partition by reading a copy of a corresponding logical partition from a second storage node.

Typically, the storage node is further adapted to make the determination that the node partition is noncurrent by determining that a corresponding logical partition was modified during a nonfunctional period of the given storage node prior to the recovery. Typically, the storage node is further adapted to determine that the corresponding logical partition was modified by determining that a timestamp of the corresponding logical partition is more recent than a time of the malfunction. In some embodiments, the storage node is further adapted to determine that the timestamp is more recent by testing a timestamp field at the one or more network interfaces. Typically, the storage node is a first storage node that is further adapted to determine that the timestamp is more recent by testing a timestamp field at a second storage node.

Typically, the storage node is adapted, following the recovery from the malfunction, to set a validation flag of each node partition in the set to be invalid.

Typically, the storage node is further adapted to make the determination for the node partition by making the determination for each node partition in the set.

In some embodiments, the storage node is adapted to make the determination and process the node partition by making the determination for, and processing, each of the node partitions in the set.

Typically, the storage node is adapted to perform a check that the malfunction has been alleviated. Typically, the storage node is further adapted to perform the check by determining that non-volatile memory on the storage node remains intact.

Typically, the storage node is adapted to issue an indication of the malfunction responsively to determining that there is an impending malfunction.

Typically, the apparatus includes a control unit operative to make the storage node functional following the malfunction by automatically resetting the given storage node.

Alternatively or additionally, the apparatus includes a control unit operative to make the storage node functional by notifying a human operator that the storage node needs to be manually repaired.

In some embodiments, the apparatus includes a control unit operative, responsively to receiving a malfunction indication, to divert an input/output command addressing any of the node partitions in the set.

The present invention will be more fully understood from the following detailed description of the embodiments thereof, taken together with the drawings, a brief description of which is given below.

DETAILED DESCRIPTION OF EMBODIMENTS

Figure 1:
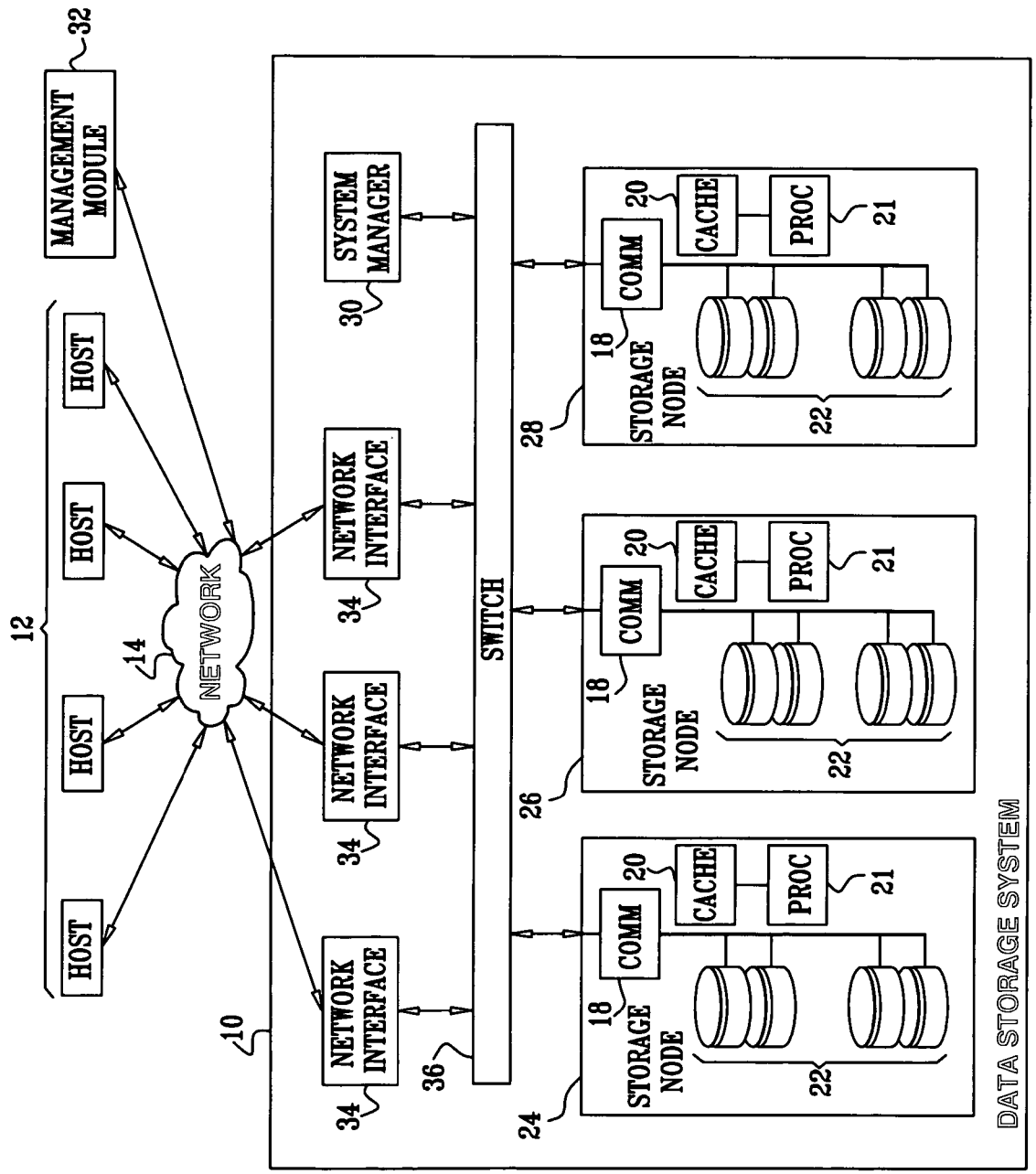
FIG. 1 is a schematic block diagram of a data storage system, according to an embodiment of the present invention.

Reference is now made to FIG. 1, which is a schematic block diagram of a storage system 10, according to an embodiment of the present invention. System 10 provides data storage for one or more hosts 12, which are coupled to the storage system by any means known in the art, for example, via a network such as the Internet or by a bus. Herein, by way of example, hosts 12 and system 10 are assumed to be coupled by a network 14. Storage system 10 typically operates in, or as, a network attached storage (NAS) or a storage area network (SAN) system. However, it will be understood that the scope of the present invention is not limited to storage systems operating in any particular configuration. Rather, the scope of the present invention includes systems operating in any suitable configuration used for storing data.

Storage system 10 comprises one or more storage nodes, indicated in FIG. 1 as nodes 24, 26, and 28. However, it will be appreciated that the number of nodes used in system 10 may be any convenient number. Nodes 24, 26, and 28 are distinguished from each other to facilitate the exposition of node operation hereinbelow. All nodes in system 10 are assumed to operate in substantially the same manner and to comprise substantially similar elements.

Each of nodes 24, 26, and 28 is assumed to comprise a set of physical storage 22. Each set of physical storage comprises multiple slow and/or fast access, non-volatile, mass storage devices, hereinbelow assumed to be multiple hard disks. Each of nodes 24, 26, and 28 is also assumed to comprise a communications interface 18, which performs the task of communicating with other elements of the data storage system. A data storage node may also comprise a cache 20 that provides a fast source of recently accessed data, typically saved in Random Access Memory (RAM). Typically, a data storage node also comprises a node processor 21 and a source of executable software, not shown in the figure. It will be appreciated that actions performed by a node as described hereinbelow are implemented by the node processor.

Storage system 10 receives, from hosts 12, input/output (I/O) commands, comprising commands to read or write data at logical addresses on logical volumes. The logical addresses specify a range of data blocks or bytes within a logical volume.

In some embodiments of the present invention, a storage system 10 receives from a management module 32 a formation command to form logical volumes, such as a logical volume V1. The purpose of the formation command is to permit hosts 12 to specify logical addresses of V1 in subsequent I/O commands.

In response to the formation command, a system manager 30 typically creates distribution records, which map the logical addresses to logical partitions distributed across nodes 24, 26, and 28. Logical partitions typically comprise a set of logical addresses which may, for example, comprise 64 KB.

Herein, by way of example, system manager 30 is assumed to be a single discreet element of system 10. In alternative embodiments, the functions performed by system manager 30 may be performed fully or in part by other system elements. Moreover, functions may be performed in a distributed manner by multiple elements, such as nodes 24, 26, and 28, and/or network interfaces 34 described further hereinbelow.

To support fault tolerant operation, more than one copy of each logical partition is stored in the system. Each copy stored on a node is referred to hereinbelow as a node partition. The distribution records, collectively referred to as a distribution mapping, indicate the storage nodes at which node partitions are to be accessed.

To generate the distribution mapping, system manager 30 utilizes a master table or an algorithm based on the number of available nodes. If a node is added to the system, the distribution mapping may be configured to redistribute logical partitions across all the nodes, including the added node.

In an embodiment of the present invention, the mapping of logical partitions is implemented according to methods is described in U.S. Patent Publication 2005/0015566, titled "Data Allocation in a Distributed Storage System," which is assigned to the assignees of the present invention and which is incorporated herein by reference.

The distribution mapping is stored on each of the one or more generally similar network interfaces 34 of storage system 10. The network interfaces are indicated in FIG. 1 as three network interfaces 34, but it will be understood that system 10 may comprise any convenient number of network interfaces.

Subsequent to the formation of V1, network interfaces 34 receive I/O commands from hosts 12 specifying logical addresses of V1. A network interface uses the distribution mapping to break the I/O commands into internal I/O commands that are then distributed among nodes 24, 26, and 28.

Routing of commands from network interfaces 34 to each node is typically performed over a fast coupling system, such as a network, bus or switch. Herein, by way of example, the network interfaces are coupled to the nodes by a switch 36. Network interfaces 34 operate substantially independently of each other.

Storage nodes 24, 26, and 28 typically incorporate a monitoring technology such as the Intelligent Platform Management Interface (IPMI) described in the Background of the Invention; if such a technology is incorporated, a system manager 30 may use it as is described below. Alternatively or additionally, software and/or hardware is incorporated into the system, and/or into the storage nodes, that enable system manager 30 to monitor parameters and characteristics of the nodes similar to those monitored by the IPMI technology. Further alternatively or additionally, U.S. patent application Ser. No. 11/123,634, filed May 6, 2005 and titled "Automatic Disk Healing," which is assigned to the assignees of the present invention and which is incorporated herein by reference, describes methods and parameters for monitoring activity of storage nodes; these methods and parameters may be advantageously used in system 10.

Figure 2:
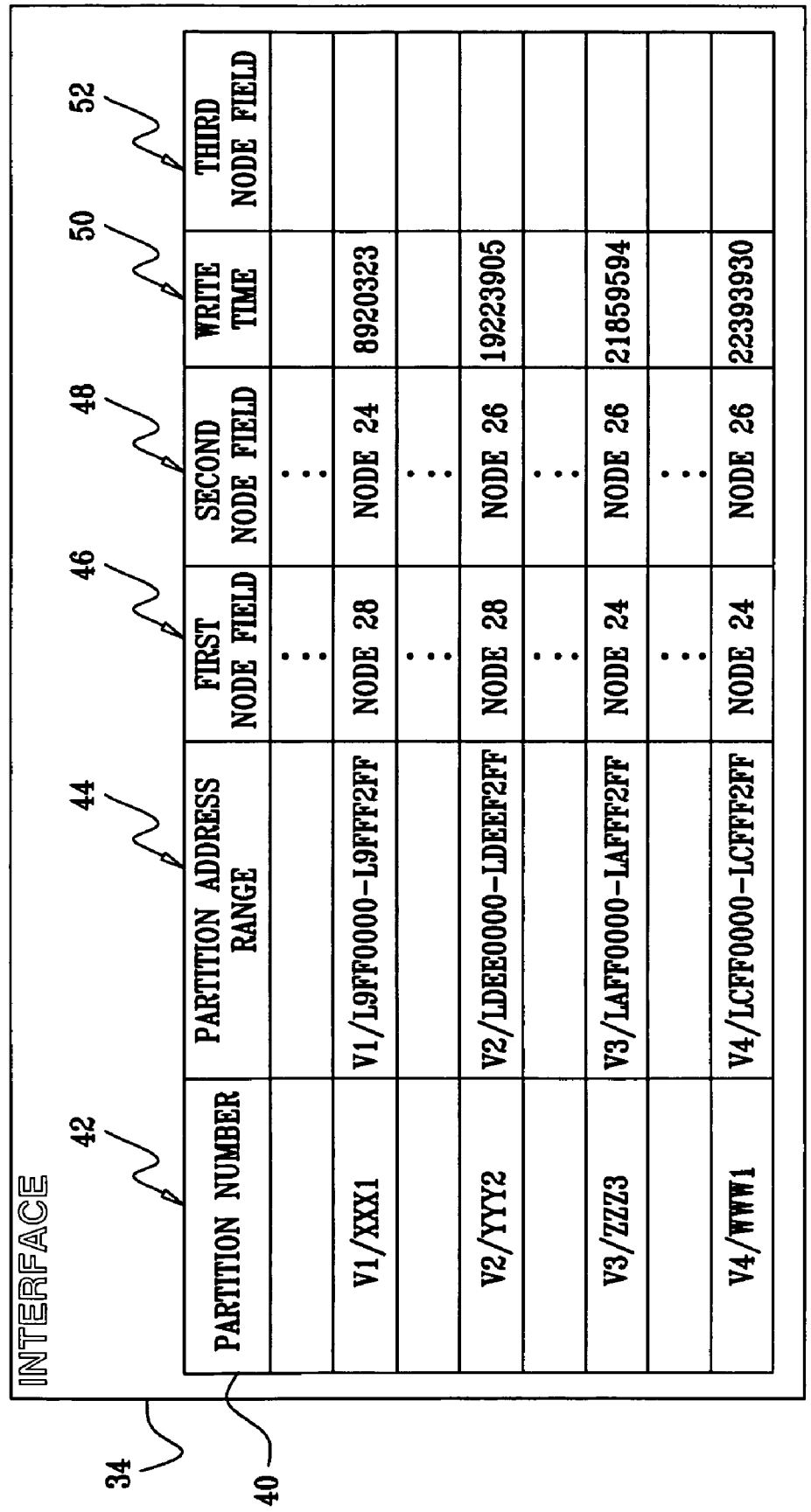
FIG. 2 is a schematic diagram of a mapping used in the system of FIG. 1, assumed to be in tabular form, according to an embodiment of the present invention.

FIG. 2 is a schematic diagram of a distribution mapping 40 stored at network interfaces 34 and assumed to be in tabular form, according to an embodiment of the present invention. As described hereinabove, the distribution records are distributed by system manager 30 to network interfaces 34.

Respective fields of the distribution records are as follows. A field 42 lists a logical partition number. By way of example, the number is shown as a combination of a logical volume identification and a logical partition number, separated by a "/". Alternatively, the logical partition number may be any code that uniquely identifies the logical partition. A field 44 lists the logical addresses of the indicated logical volume that are mapped to the given logical partition. The logical addresses are shown in the form of a range of addresses. Alternatively, the logical addresses could be specified as a starting address for the range. Herein, to differentiate logical addresses from physical addresses, the former are prefixed by "L" and the latter by "P."

System 10 is an example of a singly-redundant data storage system, so that a third field 46 and a fourth field 48 respectively list a first node and a second node associated with each logical partition, the nodes being selected from nodes 24, 26, and 28 and being different from each other. It will be understood that nodes other than the first and the second nodes exemplified here may be associated with each partition, according to the number of available nodes and according to the amount of redundancy incorporated into system 10. Thus, for a doubly-redundant system, mapping 40 includes a field 52 having a third node associated with each logical partition, the third node being different from the first and second nodes.

An I/O command received by one of network interfaces 34 may be broken into several internal I/O commands, each specifying one logical partition, or part of a logical partition, to be read or written. A network interface directs each internal I/O command to one or more of nodes 24, 26, and 28 according to mapping 40. If the I/O command is a read command, the interface transmits the internal I/O read command to either the first or the second node indicated by the corresponding distribution record. The interface may simply transmit the read command to the first node, or a load balancing scheme may be implemented wherein the interface transmits the read command to whichever of the first and second nodes is less busy.

If the I/O command is a write command, the interface transmits the internal I/O command to all the nodes indicated in mapping 40 for the logical partition. For a write command, the interface also updates a write timestamp field 50 of the corresponding distribution record. The entry in the timestamp field may be generated by an internal clock of a central controller, typically system manager 30.

After timestamp field 50 is updated, the interface typically sends a message to system manager 30 indicating the timestamp update. In some embodiments of the present invention, the system manager also distributes the updated version of the table (including the timestamp) to all interfaces 34.

Figure 3:
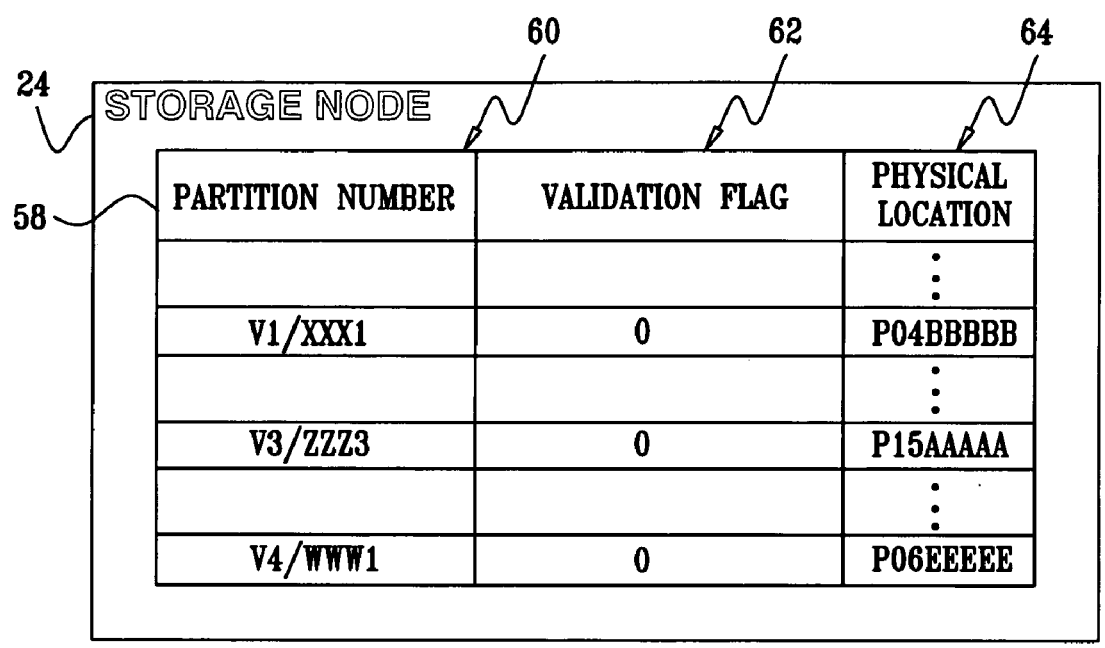
FIG. 3 is a schematic diagram of a location table, according to an embodiment of the present invention.

FIG. 3 is a schematic diagram of a location table 58, according to an embodiment of the present invention. Each of nodes 24, 26, and 28 maintains a respective location table 58. FIG. 3 shows location table 58 for node 24.

Each table 58 comprises rows of partition descriptor records (PDRs), wherein each record is comprised of several fields, as described hereinbelow.

A field 60 comprises a partition number, corresponding to field 42 of mapping 40 described above.

A field 62 comprises a validation flag, described further hereinbelow. In one embodiment, this field comprises one bit, wherein 0 indicates a valid node partition and 1 indicates an invalid node partition.

A field 64 lists the physical location in physical storage 22 at which the node partition is stored. Upon receiving an I/O command, a node determines a physical location on physical storage 22 at which to store or to access the logical partition specified by the command, using methods known in the art. For the sake of clarification, the physical location is indicated in table 58 in the form PHHXXXXX, where P indicates that the location is a physical address, HH is the number of the disk (herein assumed by way of example to be from 01 to 15) and XXXXX is the location within the disk.

PDRs may also comprise a timestamp field, not shown, to store the time of the most recent update of a partition. Use of the timestamp field is described further with respect to FIG. 5, hereinbelow. PDRs may also comprise one or more additional fields, also not shown, reflective of alternate, redundant nodes. For a single level of redundancy, corresponding to the exemplary mapping 40, PDRs may include a single additional field.

Figure 4:
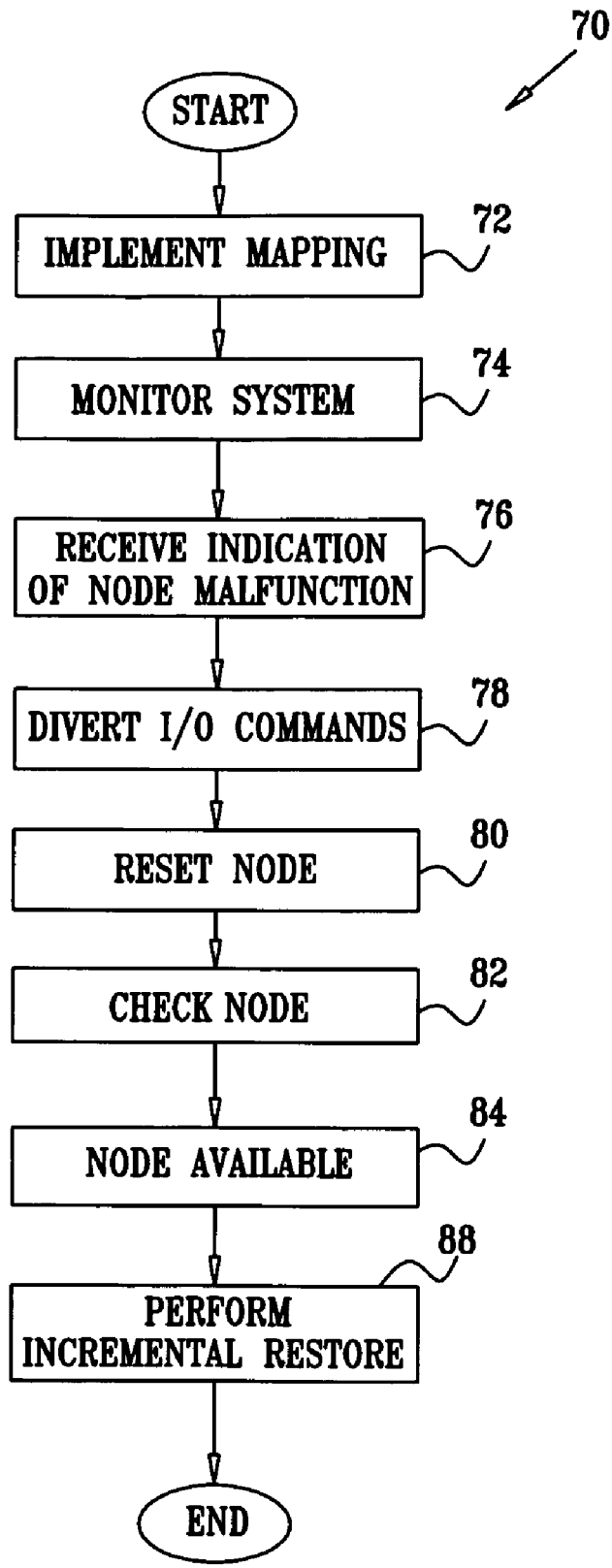
FIG. 4 is a flowchart showing steps performed in operating the system of FIG. 1, according to an embodiment of the present invention.

FIG. 4 is a flowchart 70 showing steps performed in operating the system 10, according to an embodiment of the present invention. At a first step 72, system 10 is initially configured so that there is substantially even load balancing for I/O requests conveyed to all storage nodes. The configuration may advantageously be implemented generally as described in the U.S. Patent Applications referenced above. Configuration includes preparing tables 58 and mapping 40 (FIGS. 2 and 3). System manager 30 may also maintain copies of tables 58 and of mapping 40 to enhance redundancy and to improve data retrieval efficiency within the system.

At a system monitoring step 74, system manager 30 monitors system 10 to determine whether a node has malfunctioned. System manager 30 may use a number of monitoring methods. For example, interfaces 34 may be configured to issue an alert to the system manager when there is an indication of a node failure, such as a time-out of an I/O command directed to a node. Alternatively or additionally, a node with IPMI capability, as described hereinabove, or similar self-monitoring capability may report a malfunction of an internal element, such as a hard disk, a cache, or a communication controller. It is to be understood that a malfunction may also be an indication of an impending malfunction, or any incongruous behavior that may result in degraded operation.

After an indication of a node malfunction is received at a step 76, the system manager records a malfunction indication time, which will be used subsequently to restore the node to operation. By way of example, the malfunctioning node is assumed to be node 24.

At a subsequent step 78, the interfaces 34 are notified of the malfunction by the system manager. In alternative embodiments, node 24 directly notifies network interfaces 34 by broadcasting the malfunction indication throughout the system, or interfaces 34 may independently determine that a malfunction condition has occurred. The interfaces 34 subsequently divert all I/O commands intended for node 24 to alternate nodes specified by mapping 40. Thus, following the example of FIG. 2, an I/O command referencing partition number V1/XXX1 at node 24 would be directed to node 28, and an I/O command referencing partition number V3/ZZZ3 at node 24 would be directed to node 26.

In a further alternative embodiment, interfaces 34 are not notified of the malfunction and continue to direct subsequent I/O commands to node 24. Because of the malfunction and/or the subsequent attempt to restore node 24, as described below (step 80), node 24 may not respond to the subsequent I/O commands. Interfaces 34 are configured to determine a timeout period after sending an I/O command to a node. If node 24 does not respond to an I/O command from an interface within the timeout period, the interface sends the I/O command to an alternate node. System 10 thus continues to operate after the malfunction, though at a reduced level of redundancy. It may therefore be understood that using one of the abovementioned methods, system 10 continues to implement read and write I/O commands received from hosts 12.

At a step 80, an attempt is made overcome the malfunction, either by automatic or manual means. Many malfunctions, ranging from mechanical to software glitches, may be overcome by performing a reset. The reset may comprise performing an automated power down followed by an automated power on, utilizing methods for automated power switching known in the art. Alternatively, a software reboot is performed by the node. Typically, the system manager issues a control signal to initiate the reset. Alternatively, the node may perform a self-initiated reset. If the malfunction is due to a mechanical failure, an automated reset may not fix the node and the system manager may issue a message to a human operator that manual intervention should be attempted to perform an effective reset or alternatively to perform other steps effectively repairing the node.

Following the manual or automated intervention, at a step 82, a check is made to confirm that the malfunction has been alleviated. The check may be implemented by the system manager or, additionally or alternatively, by node 24 itself. A self-check by the node may also confirm that non-volatile data that existed on node 24 before the malfunction indication time, including node partitions, as well as meta-data such as table 58, remain intact and have not been corrupted. During the process of the check, node 24 also sets the validation flag (field 62 in FIG. 3) of each PDR, to indicate that the corresponding node partition has yet to be validated at a validation step 88, described hereinbelow.

If the check fails, or, alternatively, if the system manager does not receive an indication from the node of operability within a given period subsequent to the malfunction, such as one to ten minutes, the system manager will issue a failure message to management module 32 at a subsequent step not shown in the flowchart. Also at this subsequent step, the system manager may perform a remapping of the functioning nodes. When mapping is performed according to the methods described in the abovementioned U.S. Patent Publication 2005/0015566, the system manager may perform the remapping to include nodes of a reduced set that comprises the original set of one or more storage nodes, less the malfunctioning node. The remapping restores redundancy and load balancing across the system. The new mapping is achieved by writing copies of logical partitions to new physical locations distributed across the nodes of the reduced set.

Assuming that the node check at step 82 succeeds, then the node is assumed to have recovered from the malfunction and, at a step 84, the node is made available for continued operation. In the embodiment of the present invention described at step 78 above, wherein interfaces 34 divert I/O commands after the malfunction, the diversion ceases at step 84. Node 24 now begins to receive I/O commands. However, before an I/O command referencing a specific node partition is accepted by the node, the node must validate the node partition at validation step 88, described further with regard to FIG. 5. After completing step 88, process 70 is complete.

Figure 5:
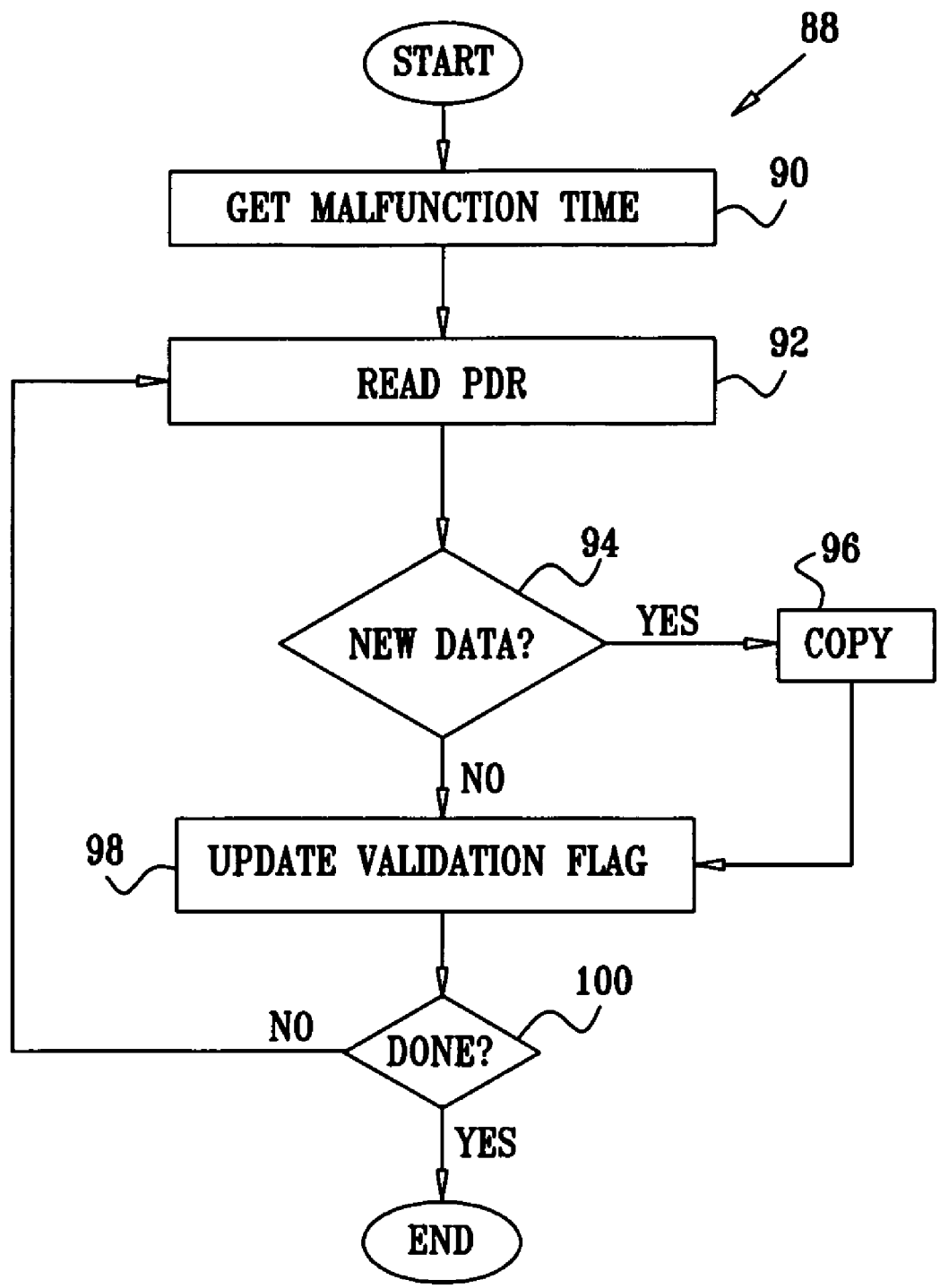
FIG. 5 is a flowchart showing steps performed in operating the system of FIG. 1, at a reaction step of the flowchart of FIG. 4, according to an embodiment of the present invention.

FIG. 5 is a flowchart of actions taken by system 10 at validation step 88, according to an embodiment of the present invention. Step 88 comprises an incremental process of checking each node partition and updating the node partition if it is not valid.

A node partition is valid if it is identical to the corresponding logical partition. Validation comprises determining whether the logical partition corresponding to the node partition was modified subsequent to the malfunction, in which case the node partition and the logical partition are not identical, as the node partition is noncurrent vis-à-vis the logical partition. In cases in which a node partition is noncurrent, the node partition must be updated.

At an initial step 90, node 24 obtains the malfunction indication time from the system manager. Alternatively, node 24 may save the time of the malfunction in its own nonvolatile memory, such as in physical storage 22.

At a step 92, node 24 reads a partition number (field 60 of table 48) of a PDR stored on node 24 and corresponding to a node partition on node 24 that is to be validated.

Subsequently, at a step 94, the node determines whether the node partition is current by making a comparison between the malfunction indication time and the timestamp of the corresponding logical partition. Typically, node 24 reads the timestamp from a distribution record retrieved by node 24 from one of network interfaces 34. Alternatively, a PDR may include an alternate node location field, as well as a timestamp field. In this alternative embodiment, node 24 reads from the alternate node location the timestamp stored with a corresponding PDR at the alternate location.

Typically, an actual time of malfunction is assumed to have occurred a small interval, such as one second, before the malfunction indication time, and thus the timestamp is typically compared to the malfunction indication time minus the small interval.

If the timestamp is more recent than the malfunction indication time minus the small interval, then new data was written to the logical partition during the period that node 24 was nonfunctional and the node partition must be updated. The "yes" branch of step 94 is therefore followed to a step 96, at which the node reads a copy of the logical partition from the alternate location, thereby replacing the former node partition with a new version. Once the copying is completed, the node partition is current with logical partition, and, at a step 98, the validation flag of the node partition (field 62 of the PDR) is set to indicate that the node partition is valid. It may be appreciated that the copying process of step 96 and the subsequent step 98 occur as a single atomic transaction, whereby both the node partition of node 24 and the copy of the logical partition at the alternate location are locked until the process has been successfully completely.

Conversely, if it is determined at step 94 that new data was not written to the partition after the malfunction of node 24, then no data is transferred, because the node partition stored on node 24 reflects the current state of the logical partition. The "no" branch from step 94 is followed directly to step 98, at which the validation flag is of the node partition is set as valid.

At a step 100, node 24 determines whether all distribution records have been processed. If not, processing continues at step 92, at which the next distribution record is read. After all records are processed, step 88 is complete.

As described above, with regard to step 84, a command referencing a specific node partition is accepted by node 24 if the specific node has been validated. In an embodiment of the present invention, the node, upon receiving an I/O command referencing a specific node partition that has not been validated, will perform the actions of validation step 88 with respect the specific node partition, after which the I/O command will be implemented.

It will be apparent to one skilled in the art that alternative configurations of the apparatus may be employed to perform the tasks of validation. For example, the system manager may be configured to determine for each node partition on node 24 whether an update is required, and, if so, to write a copy of the node partition at a redundant location to node 24.

It thus will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for operating a data storage system having one or more network interfaces and a plurality of data storage nodes configured to provide redundant storage locations, the method comprising:
   storing a first set of node partitions on a first storage node of the plurality of data storage nodes, each node partition including a corresponding logical partition;
   storing a second set of node partitions corresponding to the first set of node partitions on a second storage node of the plurality of data storage nodes;
   following a recovery by the first storage node from a malfunction, determining if a node partition in the first set of node partitions stored in the first storage node is current or noncurrent, wherein said determining comprises:
      comparing a time that a logical node partition corresponding to the node partition was last modified to a time of an indication of the malfunction,
      determining that the node partition is current if the time that the logical node partition was last modified occurred prior to the indication of the malfunction minus a predetermined amount of time, and
      determining that the node partition is noncurrent if the time that the logical node partition was last modified occurred after the indication of the malfunction minus the predetermined amount of time; and
   processing the node partition according to the determination,
      wherein determining if the node partition is current or noncurrent comprises determining that a timestamp indicative of the time the logical node partition was modified is more recent than the indication of the malfunction minus the predetermined amount of time.

2. The method according to claim 1, wherein processing the node partition according to the determination that the node partition is current comprises making the node partition accessible to the one or more network interfaces without updating the node partition.

3. The method according to claim 2, wherein processing the node partition according to the determination that the node partition is current further comprises setting a validation flag of the node partition to be valid.

4. The method according to claim 1, wherein processing the node partition according to the determination that the node partition is noncurrent comprises updating the node partition and subsequently making the node partition accessible to the one or more network interfaces.

5. The method according to claim 4, wherein processing the node partition according to the determination that the node partition is noncurrent further comprises setting a validation flag of the node partition to be valid after updating the node partition.

6. The method according to claim 4, wherein the given storage node is a first storage node and wherein updating the node partition comprises reading a copy of a corresponding logical partition from a second storage node.

7. The method according to claim 1, wherein determining that the timestamp of the logical node partition is more recent than the indication of the malfunction minus the predetermined amount of time comprises testing a timestamp field at the one or more network interfaces.

8. The method according to claim 1, wherein determining that the timestamp of the logical node partition is more recent comprises testing a timestamp field at the logical node partition.

9. The method according to claim 1, and further comprising, following the recovery from the malfunction, setting a validation flag of each logical node partition in the first set of node partitions to be invalid.

10. The method according to claim 1, further comprising determining if each node partition in the first set of node partitions is current or noncurrent.

11. The method according to claim 1, further comprising processing each node partition in the first set of node partitions based on the determination of whether each respective node partition is current or noncurrent.

12. The method according to claim 1, and comprising performing a check that the malfunction has been alleviated.

13. The method according to claim 12, wherein performing the check comprises determining that non-volatile memory on the given storage node remains intact.

14. The method according to claim 1, and comprising issuing an indication of the malfunction responsively to determining that there is an impending malfunction.

15. The method according to claim 1, and comprising making the first storage node functional following the malfunction.

16. The method according to claim 15, wherein making the first storage node functional comprises automatically resetting the first storage node.

17. The method according to claim 15, wherein making the first storage node functional comprises manually repairing the first storage node.

18. The method according to claim 1, further comprising, responsively to receiving the malfunction indication, diverting an input/output command addressing any of the node partitions in the first set of node partitions.

19. The method according to claim 1, wherein the predetermined amount of time is one second.

20. An apparatus for operating a data storage system comprising:
   one or more network interfaces; and
   a storage node configured to provide redundant storage locations and comprising a set of node partitions, each node partition including a corresponding logical node partition, the storage node configured to, following a recovery from a malfunction:
      determine if a node partition in the set of node partitions is current or noncurrent, wherein said determining comprises:
         comparing a time that a logical node partition corresponding to the node partition was last modified to a time of an indication of the malfunction, determining that the node partition is current if the time that the logical node partition was last modified occurred prior to the indication of the malfunction minus a predetermined amount of time, and determining that the node partition is noncurrent if the time that the logical node partition was last modified occurred after the indication of the malfunction minus the predetermined amount of time; and process the node partition according to the determination, wherein:

the storage node is further adapted to make the determination that the node partition is noncurrent by determining that a corresponding logical partition was modified during a nonfunctional period of the storage node prior to the recovery, and the storage node is further adapted to determine that the corresponding logical partition was modified by determining that a timestamp of the corresponding logical partition is more recent than the indication of the malfunction minus the predetermined amount of time.

21. The apparatus according to claim 20, wherein the storage node is further adapted to process the node partition according to the determination that the node partition is current by making the node partition accessible to the one or more network interfaces without updating the node partition.

22. The apparatus according to claim 21, wherein the storage node is further adapted to process the node partition according to the determination that the node partition is current by setting a validation flag of the node partition to be valid.

23. The apparatus according to claim 20, wherein the storage node is further adapted to process the node partition according to the determination that the node partition is noncurrent by making the node partition accessible to the one or more network interfaces after updating the node partition.

24. The apparatus according to claim 23, wherein the storage node is further adapted to process the node partition according to the determination that the node partition is noncurrent by setting a validation flag of the node partition to be valid after updating the node partition.

25. The apparatus according to claim 23, wherein the storage node is a first storage node and wherein the storage node is further adapted to update the node partition by reading a copy of a corresponding logical partition from a second storage node.

26. The apparatus according to claim 20, wherein the storage node is further adapted to determine that the timestamp is more recent by testing a timestamp field at the one or more network interfaces.

27. The apparatus according to claim 20, wherein the storage node is a first storage node that is further adapted to determine that the timestamp is more recent by testing a timestamp field at a second storage node.

28. The apparatus according to claim 20, wherein the storage node is further adapted, following the recovery from the malfunction, to set a validation flag of each node partition in the set to be invalid.

29. The apparatus according to claim 20, wherein the storage node is further adapted to make the determination for the node partition by making the determination for each node partition in the set.

30. The apparatus according to claim 20, wherein the storage node is further adapted to make the determination and process the node partition by making the determination for, and processing, each of the node partitions in the set.

31. The apparatus according to claim 20, wherein the storage node is further adapted to perform a check that the malfunction has been alleviated.

32. The apparatus according to claim 31, wherein the storage node is further adapted to perform the check by determining that non-volatile memory on the storage node remains intact.

33. The apparatus according to claim 20, wherein the storage node is further adapted to issue an indication of the malfunction responsively to determining that there is an impending malfunction.

34. The apparatus according to claim 20, and comprising a control unit operative to make the storage node functional following the malfunction by automatically resetting the given storage node.

35. The apparatus according to claim 20, and comprising a control unit operative to make the storage node functional by notifying a human operator that the storage node needs to be manually repaired.

36. The apparatus according to claim 20, and comprising a control unit operative, responsively to receiving a malfunction indication, to divert an input/output command addressing any of the node partitions in the set.

* * * * *